US012312977B2

(12) United States Patent
Sibbach et al.

(10) Patent No.: US 12,312,977 B2
(45) Date of Patent: May 27, 2025

(54) TURBINE ENGINE WITH A PRIMARY STAGE OF AIRFOILS AND A SUBSIDIARY STAGE OF AIRFOILS

(71) Applicant: GENERAL ELECTRIC COMPANY, Schenectady, NY (US)

(72) Inventors: Arthur William Sibbach, Boxford, MA (US); Nicholas Joseph Kray, Mason, OH (US); Benjamin Thomas Van Oflen, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/489,533

(22) Filed: Oct. 18, 2023

(65) Prior Publication Data

US 2025/0129723 A1    Apr. 24, 2025

(51) Int. Cl.
  *F01D 5/28*    (2006.01)
  *F02K 3/06*    (2006.01)

(52) U.S. Cl.
  CPC .............. *F01D 5/286* (2013.01); *F02K 3/06* (2013.01); *F05D 2240/303* (2013.01); *F05D 2300/603* (2013.01)

(58) Field of Classification Search
  CPC ... F01D 5/28; F01D 5/286; F02K 3/06; F05D 2240/303; F05D 2300/603
  See application file for complete search history.

(56) References Cited

U.S. PATENT DOCUMENTS

| 5,141,400 | A | * | 8/1992 | Murphy | ............... F01D 5/3007 416/241 A |
| --- | --- | --- | --- | --- | --- |
| 5,674,370 | A | * | 10/1997 | DuPree | ................. F04D 29/023 205/114 |
| 5,725,355 | A | | 3/1998 | Crall et al. | |
| 8,105,042 | B2 | | 1/2012 | Parkin et al. | |
| 8,419,374 | B2 | | 4/2013 | Huth et al. | |
| 8,814,527 | B2 | * | 8/2014 | Huth | ..................... F04D 29/325 416/224 |
| 10,344,711 | B2 | * | 7/2019 | Hsu | ........................ F04D 29/545 |
| 10,724,435 | B2 | * | 7/2020 | Kroger | ................. F04D 29/563 |
| 10,794,396 | B2 | * | 10/2020 | Kroger | ..................... F02C 7/04 |
| 10,815,886 | B2 | | 10/2020 | Kroger et al. | |
| 10,844,725 | B2 | | 11/2020 | Pouzadoux | |
| 11,131,314 | B2 | | 9/2021 | Welch | |
| 11,655,768 | B2 | | 5/2023 | Sibbach et al. | |
| 11,739,689 | B2 | | 5/2023 | Sibbach et al. | |
| 11,725,526 | B1 | | 8/2023 | Sibbach et al. | |
| 2016/0010468 | A1 | | 1/2016 | Kray et al. | |
| 2016/0084265 | A1 | * | 3/2016 | Yu | ........................ F04D 29/542 415/177 |

(Continued)

FOREIGN PATENT DOCUMENTS

FR    3102378 A1    4/2021

*Primary Examiner* — Woody A Lee, Jr.
*Assistant Examiner* — Joshua R Beebe
(74) *Attorney, Agent, or Firm* — McGarry Bair PC

(57) ABSTRACT

A turbine engine with an engine core defining an engine centerline and comprising a rotor assembly and a stator assembly. The turbine engine including a primary stage of airfoils circumferentially arranged about the engine centerline and defining at least a portion of the rotor assembly. A subsidiary stage of airfoils located upstream of the primary stage of airfoils and circumferentially arranged about the engine centerline.

20 Claims, 7 Drawing Sheets

(56) References Cited

U.S. PATENT DOCUMENTS

| | | | |
|---|---|---|---|
| 2018/0163746 A1* | 6/2018 | Chen | F04D 29/023 |
| 2018/0230825 A1* | 8/2018 | Gimat | F04D 29/324 |
| 2020/0116027 A1* | 4/2020 | Jain | F04D 29/388 |
| 2021/0388726 A1* | 12/2021 | Churcher | F04D 29/023 |
| 2023/0003133 A1 | 1/2023 | Gondre et al. | |
| 2023/0060010 A1 | 2/2023 | Sibbach et al. | |
| 2023/0128806 A1 | 4/2023 | Zheng | |
| 2023/0258134 A1 | 8/2023 | Sibbach et al. | |

\* cited by examiner

TURBINE ENGINE WITH A PRIMARY STAGE OF AIRFOILS AND A SUBSIDIARY STAGE OF AIRFOILS

TECHNICAL FIELD

The disclosure generally relates to a component for a turbine engine, more specifically, to a primary stage of airfoils and a subsidiary stage of airfoils upstream from the primary stage of airfoils.

BACKGROUND

In a typical turbofan application, composites materials are used for flowpath components and blades and vanes. Composite materials typically include a fiber-reinforced matrix and exhibit a high strength to weight ratio. Due to the high strength to weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine. Extreme loading or sudden forces can be applied to the composite components of the aircraft or turbine engine. For example, extreme loading can occur to one or more airfoils during ingestion of various materials by the turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
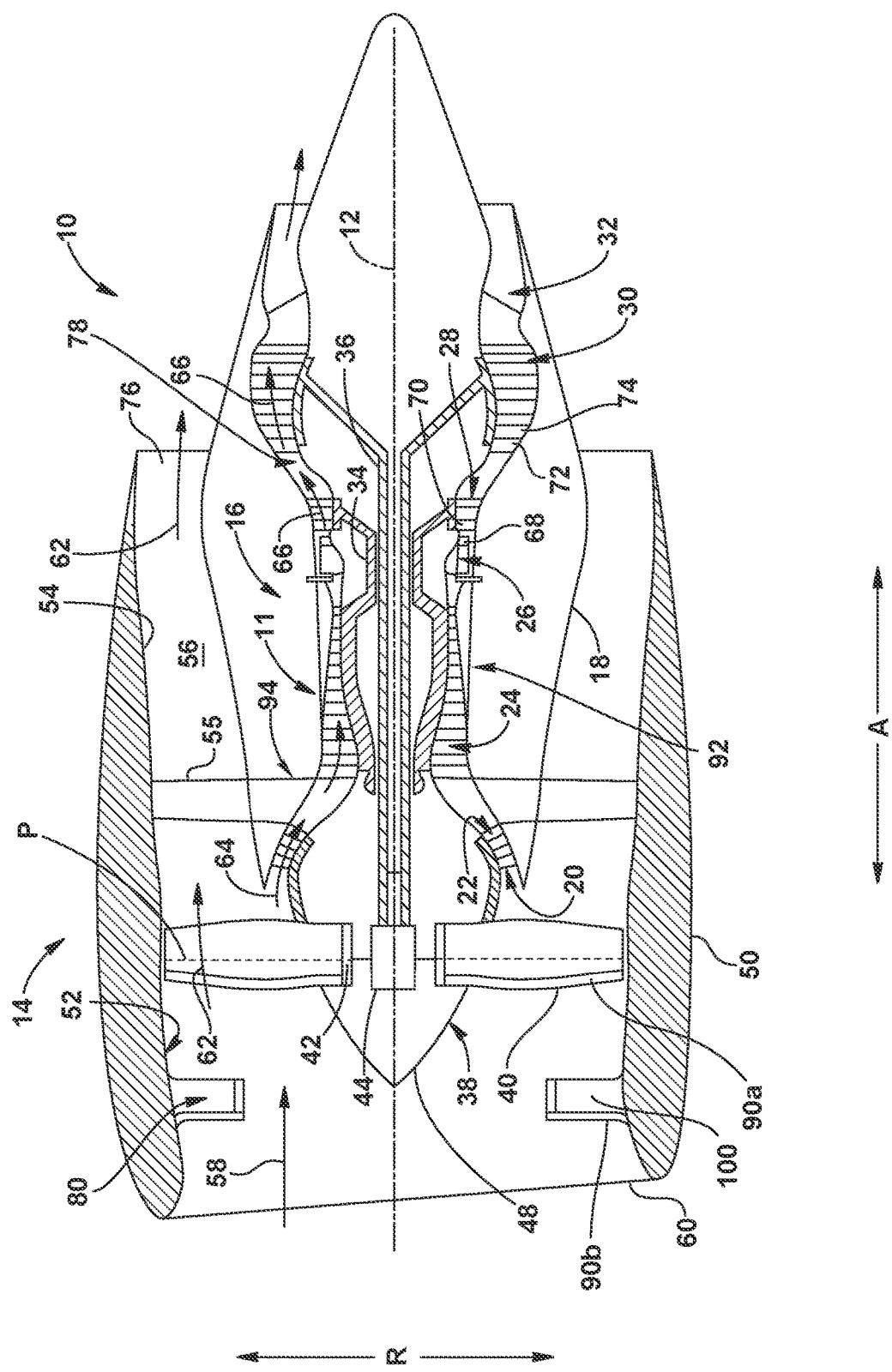
FIG. 1 is a schematic cross-sectional view of a gas turbine engine in accordance with an aspect of the disclosure herein.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Aspects of the disclosure herein are directed to a set of consecutive airfoil stages including a subsidiary stage of airfoils and a primary stage of airfoils downstream from the subsidiary set of airfoils. For purposes of illustration, the present disclosure will be described with respect to the primary stage of airfoils in the form of fan blades and the subsidiary stage of airfoils immediately upstream from the primary stage of airfoils as part-span inlet guide vanes (IGVs). While part-span IGVs and fan blades are illustrated within a high-speed engine, it should be understood that any consecutive sets of stages are contemplated. Further, it will be understood, that aspects of the disclosure herein are not so limited and may have general applicability within alternative engines, as well as in non-aircraft applications, such as other mobile applications and non-mobile industrial, commercial, and residential applications.

The term "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The terms "first", "second", and "third" may be used herein interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "fore" or "forward" means in front of something and "aft" or "rearward" means behind something. For example, with regard to a turbine engine, forward refers to a position closer to an engine inlet and aft refers to a position closer to an engine nozzle or exhaust.

The term "fluid" may be used herein in reference to a gas or a liquid, or multi-phase. The term "fluid communication" means that a fluid is capable of making the connection between the areas specified.

The terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise.

Furthermore, as used herein, the term "set" or a "set" of elements can be any number of elements, including only one.

The term "composite", as used herein is, is indicative of a component having two or more materials. A composite can be a combination of at least two or more metal, non-metallic, or a combination of metal and non-metallic elements or materials. Examples of a composite material can be, but are not limited to, a polymer matrix composite (PMC), a ceramic matrix composite (CMC), a metal matrix composite (MMC), carbon fibers, a polymeric resin, a thermoplastic, bismaleimide (BMI), a polyimide material, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example, electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing, to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds, and other like components that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

The term "leading length" or "LL" as used herein refers to a length between a leading edge of the airfoil and a seam between a leading edge protector and a portion of the airfoil.

The term "primary leading length" or "PLL" as used herein refers to the leading length of a primary stage of airfoils.

The term "subsidiary leading length" or "SLL" as used herein refers to the leading length of a subsidiary stage of airfoils immediately upstream from the primary stage of airfoils.

The term "chord length" or "CL" as used herein refers to a length between a leading edge of the airfoil and a trailing edge of the airfoil.

The term "primary chord length" or "PCL" as used herein refers to the chord length of the primary stage of airfoils.

The term "subsidiary chord length" or "SCL" as used herein refers to the chord length of the subsidiary stage of airfoils.

The term "airfoil protection factor" or "APF" as used herein refers to a relationship in the form of a ratio of the leading length to the chord length of the airfoil. As more protection is provided for any given airfoil, the leading length increases and in turn so does the APF.

The term "stage protection factor" or "SPF" as used herein refers to a relationship in the form of a ratio of the airfoil protection factor for the primary stage of airfoils, or "APF1" to the airfoil protection factor for the subsidiary stage of airfoils, or "APF2".

The term "fan pressure ratio" as used herein refers to a ratio of a pressure immediately downstream a plurality of fan blades to a pressure immediately upstream of the plurality of fan blades.

The term "fan tip speed" as used herein is defined by the plurality of fan blades and refers to a linear speed of an outer tip of each fan blade of the plurality of fan blades along a circumferential direction.

The term "rated speed" as used herein refers to a maximum operating speed of the turbine engine, in which the plurality of fan blades generates a maximum amount of power.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In certain exemplary embodiments of the present disclosure, a turbine engine defining a centerline and a circumferential direction is provided. The gas turbine engine generally includes a rotor assembly and a stator assembly. The rotor assembly and the stator assembly collectively define a substantially annular flow path through the gas turbine engine. It is contemplated that the fan blades described herein include composite fan blades located within a high-speed fan inlet.

The rotor assembly includes a set of blades. Each blade of the set of blades mounts to a rotor, such as to a disk, by a dovetail of the blade. The set of blades are distributed circumferentially about the engine centerline. It is further contemplated that the set of blades are mounted to the disk.

The stator assembly includes a set of vanes. The set of vanes extends between inner and outer bands and is distributed circumferentially about the centerline. The set of vanes also defines a set of nozzles. It is further contemplated that the set of vanes may include a single pair of vanes defining a single nozzle. The number of blades and the number of nozzles for a stage are both selected to control flow across each blade and through the nozzles.

Each of the set of blades and the set of vanes includes at least one airfoil having a protective covering on a leading edge of the airfoil. The protective covering can be any suitable material including a composite covering, a metal covering or a non-metal covering. The protective covering is referred to herein as a leading edge protector.

An amount of protective covering on the leading edge of the airfoil can be designed for various flight conditions, including take off, descent, and idle. One important factor to consider, when designing an airfoil, specifically part-span IGVs and fan blades, is balancing the added weight of the protective covering, or sheath, on the leading edge with a sufficient amount of protection needed for the leading edge of the particular airfoil. This balance between added weight and leading edge protection is particularly important in fan modules for high-speed gas turbine engines. An effective design achieves the right balance between a leading edge dominating the response to a bird ingestion or similar event, while the airfoil dominates the characteristics of blade aerodynamics, e.g., flutter.

There is a tradeoff between the percentage of the airfoil chord that is covered by the leading edge protector, and the performance of the airfoil. The protective covering provides a stiffness to the airfoil for bird ingestion, and the remainder of the blade is more flexible for aerodynamic purposes. Additionally, for the part-span IGVs the factors that influence the decision on best design are not necessarily the same. The part-span IGVs is stationary. The dynamics of a bird ingestion event on part-span IGVs differ from that of a rotating airfoil. Further still, there are a large number of part-span IGVs as compared to the number of fan blades, which also must be taken into consideration.

The inventors determined that the leading edge protector should overlap with enough of the airfoil in order to provide a strong enough bond, but it is desirable to minimize the overlap in order for the blade to flex. The leading edge protector also provides erosion protection and is required for both static and rotating airfoils. The leading edge protector characteristics have been developed from multiple tests and simulation analyses covering the ingestion of birds of varying sizes at varying span positions, and analysis of blades that have been returned for repair following bird strikes in revenue service. Furthermore, the part-span IGVs are not rotating, and experience a different stress when impacted by a bird. Multiple simulations and analyses were considered depending on how the bird strikes the fan. Simulations for a direct hit centered on a leading edge protector or for hits between two adjacent blades where it is more likely to pass through without being broken into smaller pieces occurred and were analyzed. The inventors were required to undertake a wide variety of empirical tests to determine what percent of the airfoil needs to be covered by the leading edge protector for a particular engine architecture. Differences in the forces acting upon the airfoils when struck by a bird or similar object have made the determination of percent airfoil coverage particularly challenging.

The inventors' practice has proceeded in the manner of designing airfoil stages, modifying the airfoil stages with the addition of the leading edge protector, and redesigning the airfoil stages with the leading edge protector meeting protection requirements associated with the airfoil stages. After calculating and checking the amount of protection provided and the amount of weight increase or decrease associated with the leading edge protector, and repeating the process until satisfying a certain architecture and performance requirements, the process is repeated for a different architecture and performance requirement. Examples of these architectures and performance requirements are set forth below. One example of an architecture is depicted in FIG. 1. An airfoil design that was found to meet performance requirements for one location in the engine or engine class or type may not necessarily satisfy requirements for another location.

DETAILED DESCRIPTION OF PRIMARY EMBODIMENTS

Referring now to the drawings, wherein identical numerals indicate the same elements throughout the figures, FIG. 1 is a schematic cross-sectional view of a turbine engine 10 for an aircraft. More particularly the turbine engine 10 is a high-bypass gas turbofan jet engine. As shown in FIG. 1, the turbine engine 10 has an engine core 11 defining a generally longitudinally extending axis or engine centerline 12 defining an axial direction (denoted "A"), a radial direction (denoted "R"), and a circumferential direction (i.e., a direction extending about the axial direction A; see, e.g., FIG. 6). In general, the turbine engine 10 includes a fan section 14 and a turbomachine 16 disposed downstream from the fan section 14.

The turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The LP turbine 30 may also be referred to as a "drive turbine". The turbine engine 10 as described herein is meant as a non-limiting example, and other architectures are possible, such as, but not limited to, a steam turbine engine, a supercritical carbon dioxide turbine engine, or any other suitable turbine engine.

The fan section 14 includes a variable pitch fan 38, referred to herein simply as "fan 38", having a plurality of fan blades 40 coupled to a disk 42 in a spaced apart manner. More specifically, for the embodiment depicted, the fan section 14 includes a single stage fan 38, housing a single stage of fan blades 40. As depicted, the plurality of fan blades 40 extend outwardly from disk 42 generally along the radial direction R. Each fan blade 40 is rotatable relative to the disk 42 about a pitch axis P by virtue of the plurality of fan blades 40 being operatively coupled to a suitable actuation member 44 configured to collectively vary the pitch of the plurality of fan blades 40 in unison. The fan 38 is mechanically coupled to and rotatable with the LP turbine 30, or drive turbine. More specifically, the plurality of fan blades 40, disk 42, and actuation member 44 are together rotatable about the engine centerline 12 by the LP shaft or spool 36 in a "direct drive" configuration. Accordingly, the fan 38 is coupled with the LP turbine 30 in a manner such that the fan 38 is rotatable by the LP turbine 30 at the same rotational speed as the LP turbine 30.

Further, it will be appreciated that the fan 38 defines a fan pressure ratio and the plurality of fan blades 40 each define a fan tip speed. As will be described in greater detail below, the exemplary turbofan engine 10 depicted defines a relatively high fan tip speed and relatively low fan pressure ratio during operation of the turbofan engine at a rated speed.

The disk 42 is covered by a rotatable front hub 48 aerodynamically contoured to promote an airflow 58 through the plurality of fan blades 40. Additionally, the exemplary fan section 14 includes an annular fan casing or nacelle 50 that circumferentially surrounds the plurality of fan blades 40 of the fan 38 and/or at least a portion of the turbomachine 16. More specifically, the nacelle 50 includes an inner wall 52 and a downstream section 54 of the inner wall 52 of the nacelle 50 extends over an outer portion of the turbomachine 16 so as to define a bypass airflow passage 56 therebetween. Additionally, the nacelle 50 is supported relative to the turbomachine 16 by a plurality of circumferentially spaced outlet guide vanes 55.

A rotor assembly 92 includes, but is not limited to, the fan blades 40, the HP turbine rotor blades 70, and the LP turbine rotor blades 74. The disk 42, HP shaft 34 and LP shaft 36 are also considered part of the rotor assembly 92. A stator assembly 94 includes, but is not limited to, the outlet guide vanes 55, HP turbine stator vanes 68, and the LP turbine stator vanes 72 set of vanes.

During operation of the turbine engine 10, a volume of airflow 58 enters the turbine engine 10 through an associated first inlet 60a of the nacelle 50 and fan section 14. As the volume of airflow 58 passes across the plurality of fan blades 40, a first portion of the airflow 58 as indicated by arrows 62 is directed or routed into the bypass airflow passage 56 and a second portion of the airflow 58 as indicated by arrow 64 is directed or routed into the LP compressor 22. The ratio between the first portion of air 62 and the second portion of air 64 is commonly known as a bypass ratio. The bypass ratio can range from about 7:1 to about 20:1, such as from about 10:1 to about 18:1. The pressure of the second portion of air 64 increases as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated that the turbine engine 10 depicted in FIG. 1 and described above is by way of example only, and that the turbine engine 10 can have any other suitable configuration. For example, in other exemplary embodiments, the turbomachine 16 may include any other suitable number of compressors, turbines, and/or shaft or spools. Additionally, the turbine engine 10 may not include each of the features described herein, or alternatively, may include one or more features not described herein. For example, in other exemplary embodiments, the fan 38 may not be a variable pitch fan.

In order to increase an efficiency of the turbomachine 16, the LP turbine 30 rotates at a relatively high rotational speed causing the plurality of fan blades 40 of the fan 38 to rotate at a relatively high rotational speed. For example, during operation of the turbine engine 10 at the rated speed, the fan tip speed of each of the plurality of fan blades 40 can be greater than 1,250 feet per second. In another example, in certain exemplary embodiments, during operation of the turbine engine 10 at the rated speed, the fan tip speed of each of the plurality of fan blades 40 may be greater than about 1,350 feet per second, such as greater than about 1,450 feet per second, such as greater than about 1,550 feet per second, such as up to about 2,200 feet per second.

Despite these relatively high fan tip speeds, the fan 38 is configured to produce a relatively low fan pressure ratio. For example, during operation of the turbine engine 10 at the rated speed, the fan pressure ratio of the fan 38 is less than 1.5. For example, during operation of the turbine engine 10 at the rated speed, the fan pressure ratio may be between about 1.15 and about 1.5, such as between about 1.25 and about 1.4.

As will be appreciated, operating the direct drive turbine engine 10 in such a manner may ordinarily lead to efficiency penalties of the fan 38 due to shock losses and flow separation of the airflow 58 over the plurality of fan blades 40, especially at the radially outer tips of the plurality of fan blades 40 of the fan 38. Accordingly, a set of pre-swirl features 80 are located upstream of the plurality of fan blades 40 of the fan 38 to offset or minimize such efficiency penalties of the fan 38. With the inclusion of the set of pre-swirl features 80, the efficiency gains of the turbomachine 16 due to, e.g., increased rotational speeds of the LP turbine 30, outweigh the above identified potential efficiency penalties.

The set of pre-swirl features 80 can be a plurality of part-span IGVs 100 circumferentially arranged about the engine centerline 12. The plurality of fan blades 40 can each include a first leading edge protector 90a and the plurality of part-span IGVs 100 can each include a second leading edge protector 90b. While two part-span IGVs 100 are illustrated, it should be understood that any number of part-span IGVs 100 are contemplated.

Figure 2:
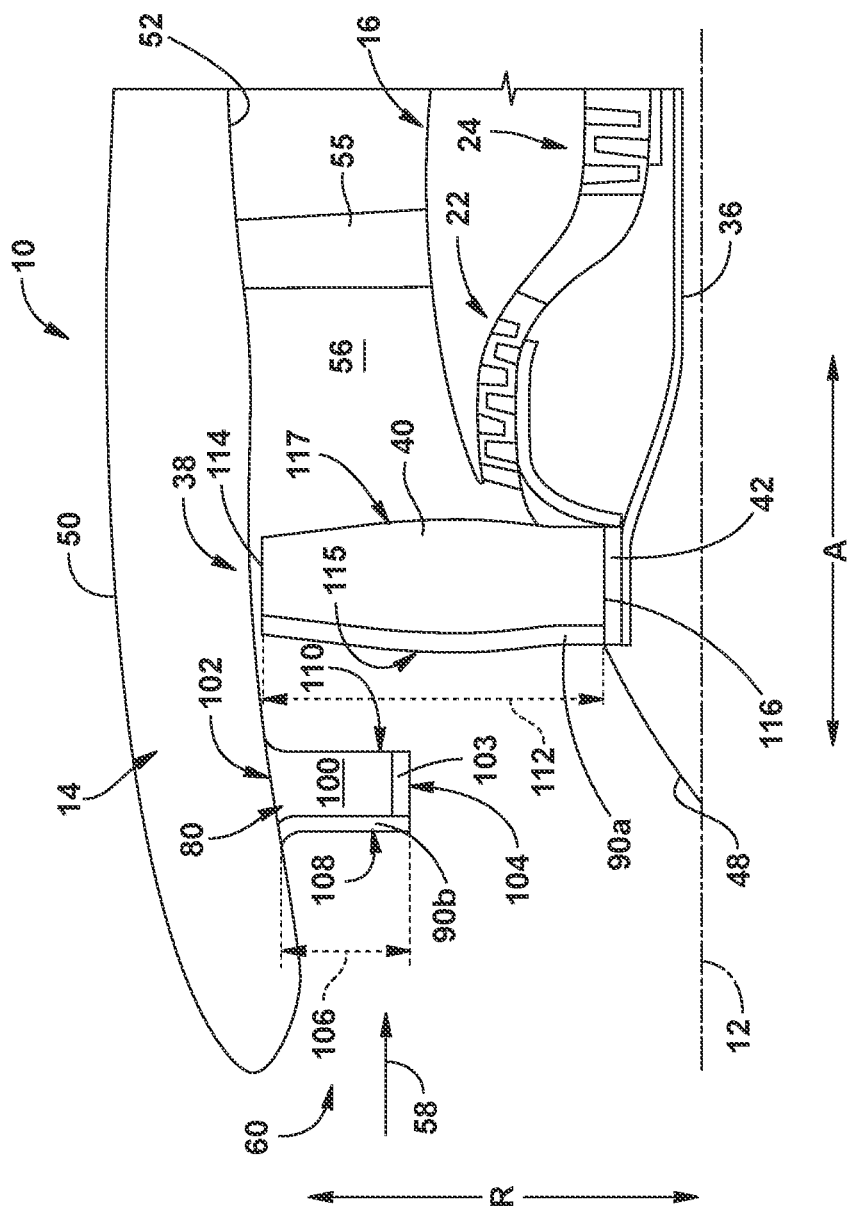
FIG. 2 is an enlarged, schematic, cross-sectional view of a forward end of the exemplary gas turbine engine of FIG. 1.

FIG. 2 is an enlarged cross-sectional view of the fan section 14 and forward end of the turbomachine 16 of the turbine engine 10 of FIG. 1. Each of the plurality of part-span IGVs 100 are attached to or integrated with the nacelle 50. The plurality of part-span IGVs 100 cantilevers from the nacelle 50 (such as from the inner wall 52 of the nacelle 50) at a location upstream from the plurality of fan blades 40 of the fan 38 along the axial direction A and aft of the first inlet 60a of the nacelle 50.

Each of the plurality of part-span IGVs 100 extends between an IGV root 102 and an IGV tip 104 along the radial direction R. Further each of the plurality of part-span IGVs 100 extend between an IGV leading edge 108 and an IGV trailing edge 110 along the axial direction A. Each of the plurality of part-span IGVs 100 are attached to/connected to the nacelle 50 at the IGV root 102 through a suitable connection means (not shown). For example, each of the plurality of part-span IGVs 100 may be bolted to the inner wall 52 of the nacelle 50 at the IGV root 102, welded to the inner wall 52 of the nacelle 50 at the IGV root 102, or attached to the nacelle 50 in any other suitable manner at the IGV root 102.

The IGV tip 104 defines a cantilevered end of each of the plurality of part-span IGVs 100, which results in a cantilevered IGV. The IGV tip 104 is therefore unconnected with an adjacent part-span IGV 100, i.e., adjacent part-span IGVs 100 do not contact one another at the IGV tips 104, and do not include any intermediate connection members at the IGV tips 104, such as, but not limited to a connection ring or a strut. More specifically, each part-span IGV 100 is completely supported by a connection to the nacelle 50 at the respective IGV root 102.

A tip cap 103 can cover at least a portion of the IGV tip 104. In some implementations the tip cap 103 can extend a full axial length of the IGV tip 104, as illustrated.

Further, each of the plurality of part-span IGVs 100 extends only partially into the first inlet 60*a* of the turbine engine 10. More specifically each of the plurality of part-span IGVs 100 defines an IGV span 106 along the radial direction R. The IGV span 106 refers to a measure along the radial direction R between the IGV root 102 and the IGV tip 104 of the part-span IGV 100 at the IGV leading edge 108 of the part-span IGV 100.

Similarly, the plurality of fan blades 40 of the fan 38 extend between a fan tip 114 and a fan root 116 along the radial direction R to define a fan blade span 112 along the radial direction R. More specifically, each of the plurality of fan blades 40 of the fan 38 also defines a fan leading edge 115 and a fan trailing edge 117, and the fan blade span 112 refers to a measurement along the radial direction R between the fan tip 114 and the fan root 116 of the fan blade 40 at the fan leading edge 115 of the respective fan blade 40.

In one example, the IGV span 106 is at least about five percent of the fan blade span 112 and up to about fifty-five percent of the fan blade span 112. For example, in certain exemplary embodiments, the IGV span 106 may be from fifteen percent of the fan blade span 112 to about forty-five percent of the fan blade span 112, such as from about thirty percent of the fan blade span 112 to about forty percent of the fan blade span 112.

Each of the plurality of part-span IGVs 100 is configured to pre-swirl the airflow 58 provided through the first inlet 60*a* of the nacelle 50, upstream of the plurality of fan blades 40 of the fan 38. Pre-swirling the airflow 58 provided through the first inlet 60*a* of the nacelle 50 prior to such airflow 58 reaching the plurality of fan blades 40 of the fan 38 may reduce separation losses and/or shock losses, allowing the fan 38 to operate with the relatively high fan tip speeds described above with less losses in efficiency.

The plurality of part-span IGVs 100 depicted in FIGS. 1 and 2 are generally configured to pre-swirl a portion of the airflow 58 through the first inlet 60*a* of the outer nacelle 50 in a rotational direction that is the same as a rotational direction of the plurality of fan blades 40 of the fan 38. For example, the plurality of fan blades 40 of the fan 38 are configured to rotate clockwise when viewed forward looking aft and the plurality of part-span IGVs 100 are configured to pre-swirl a portion of the airflow through the first inlet 60*a* of the outer nacelle 50 in the same direction. However, in other exemplary embodiments the gas turbine engine 10 can include a fan 38 with fan blades 40 configured to rotate counter-clockwise when viewed forward looking aft, in which case the plurality of part-span IGVs 100 may instead be mirrored such that they are configured to pre-swirl airflow in a counter-clockwise direction. Further, it is also contemplated that the plurality of part-span IGVs 100 are configured to pre-swirl the airflow 58 in an opposite rotational direction as the plurality of fan blades 40 of the fan 38.

Additionally, it should be appreciated that the exemplary part-span IGVs 100 depicted are provided by way of example only. The plurality of part-span IGVs 100 may have any suitable configuration for providing a desired amount of pre-swirl upstream of a plurality of fan blades of a fan of a gas turbine engine.

Figure 3:
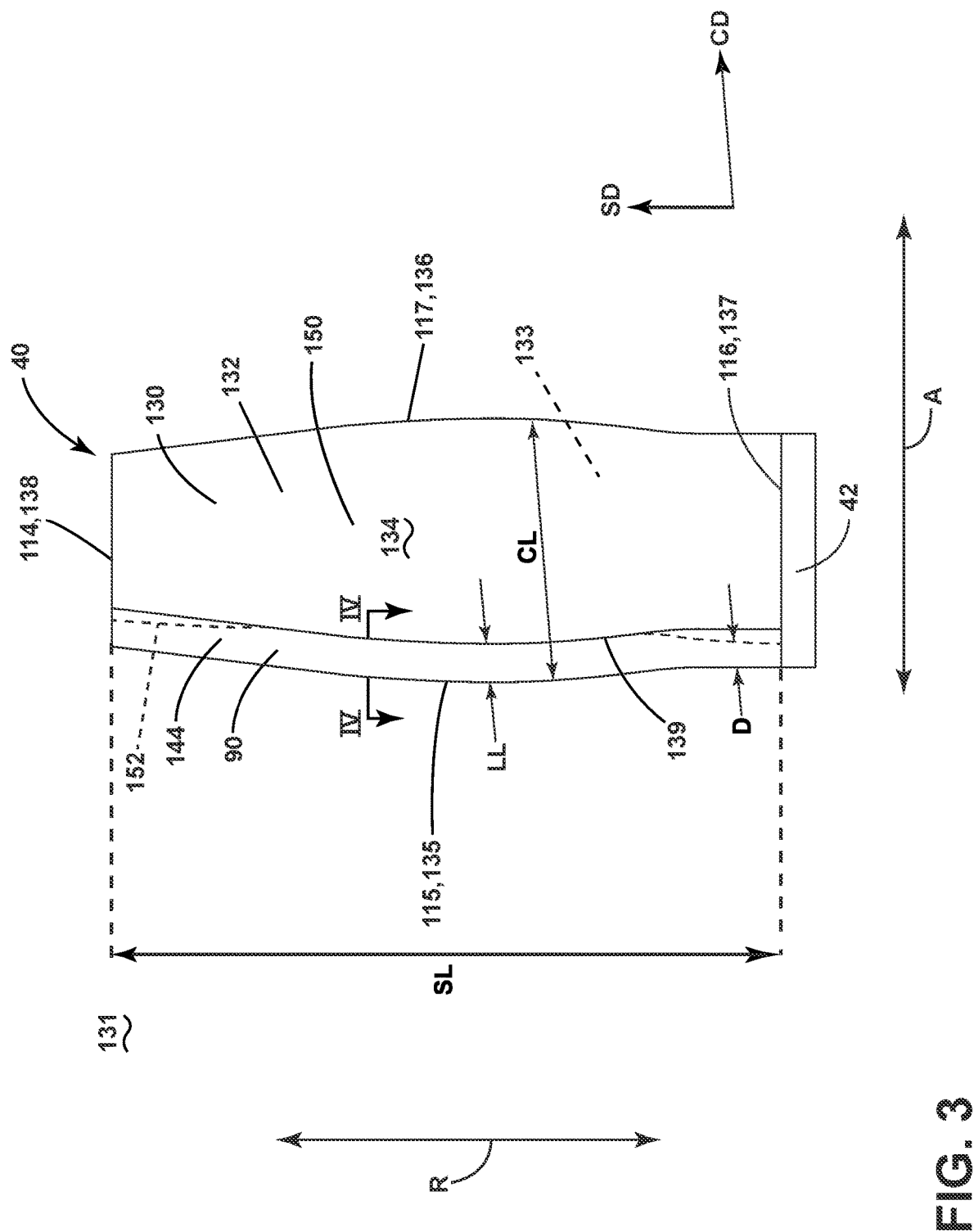
FIG. 3 is a schematic illustration of an airfoil in the form of a fan blade according to an aspect of the disclosure herein.

FIG. 3 is schematic illustration of an airfoil 130 in the form of a fan blade 131. The fan blade 131 can be, by way of non-limiting example, a single blade from the plurality of fan blades 40. While illustrated as a fan blade 131, similar properties of the airfoil 130 can be attributed to a single part-span IGV from the plurality of part-span IGVs 100 described herein. It is contemplated that the airfoil 130 can be a blade, vane, airfoil, or other component of any turbine engine, such as, but not limited to, a gas turbine engine, a turboprop engine, a turboshaft engine, or a turbofan engine.

The airfoil 130 can include a wall 132 bounding an interior 133. The wall 132 can define an exterior surface 134 extending radially between a leading edge 135 and a trailing edge 136 to define a chordwise direction (denoted "CD"). The chordwise direction CD can extend generally along the axial direction A, however with more bend in the airfoil 130, it should be understood that the chordwise direction CD can extend both into and out of the page and across the page from left to right. The airfoil 130 has a chord length (denoted "CL") measured along the chordwise direction CD between the leading edge 135 and the trailing edge 136.

The exterior surface 134 can further extend between a root 137 and a tip 138 to define a spanwise direction (denoted "SD") parallel to the radial direction R. The airfoil 130 has a span length (denoted "SL") measured along the spanwise direction SD between the root 137 and the tip 138 where the root 137 is considered 0% of the span length SL and the tip 138 is considered 100% of the span length SL. The span length SL is a measurement along the spanwise direction SD between the tip 138 and the root 137 of the airfoil 130 at the leading edge 135. It will be understood that the airfoil 130 can take any suitable shape, profile, or form including that the leading edge 135 need not be curved. The leading edge 135 can be the fan leading edge 115 and the trailing edge 136 can be the fan trailing edge 117. The root 137 can be the fan root 116 and the tip 138 can be the fan tip 114. It is also contemplated that the leading edge 135 is the IGV leading edge 108, the trailing edge is the IGV trailing edge 110, the root 137 is the IGV root 102 (FIG. 2) and the tip 138 is the IGV tip 104 (FIG. 2).

The exterior surface 134 is defined by a leading edge protector 90 and a main body portion 150. A seam 139, separates the leading edge protector 90 from the main body portion 150 along the exterior surface 134. The leading edge protector 90 extends along the chordwise direction CD between the leading edge 135 and the seam 139 to define a leading length (denoted "LL").

The leading edge protector 90 is formed from a more durable material than the main body portion 150. Typically, the leading edge protector 90 is made of, but is not limited to, steel, aluminum, refractory metals such as titanium, or superalloys based on nickel, cobalt, or iron. It should be understood that the leading edge protector 90 can be the first leading edge protector 90*a* for the fan blade 131 of the plurality of fan blades 40. Further, the leading edge protector 90 can be the second leading edge protector 90*b* for a single part-span IGV in the plurality of part-span IGVs 100. Either or both the first and second leading edge protectors 90*a*, 90*b* can be a metallic leading edge protector. Either or both of the first and second leading edge protectors 90*a*, 90*b* can be made of a polyurethane material. Further, the leading edge protectors 90, 90*a*, 90*b* described herein can be any suitable material such as metal, thermoplastic, or polyurethane, where both are the same, or different.

The main body portion 150 can include a body leading edge 152 spaced a distance (denoted "D") from the leading edge 135. The body leading edge 152 can define at least a portion of, or all of the seam 139. It is further contemplated that at least a part of the leading edge protector 90 overlaps the main body portion 150 such that at least a portion of, illustrated in dashed line, or all of the body leading edge 152 is located upstream from the seam 139. In other words, the leading edge protector 90 can define a sheath 144, or protective covering on the body leading edge 152.

The main body portion 150 can be a composite component made of one or more layers of material. The one or more layers of material can be applied during the same stage or different stages of the manufacturing of the airfoil 130. By way of non-limiting example, the main body portion 150 can include at least a polymer matrix composite (PMC) portion or a polymeric portion. The polymer matrix composite can include, but is not limited to, a matrix of thermoset (epoxies, phenolics) or thermoplastic (polycarbonate, polyvinylchloride, nylon, acrylics) and embedded glass, carbon, steel, or Kevlar fibers.

The leading edge protector 90 and the main body portion 150 can be formed by a variety of methods, including additive manufacturing, casting, electroforming, or direct metal laser melting, in non-limiting examples. As used herein, an "additively manufactured" component refers to a component formed by an additive manufacturing (AM) process, wherein the component is built layer-by-layer by successive deposition of material. AM is an appropriate name to describe the technologies that build 3D objects by adding layer-upon-layer of material, whether the material is plastic, ceramic, or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. It is also contemplated that a process utilized could include printing a negative of the part, either by a refractory metal, ceramic, or printing a plastic, and then using that negative to cast the component.

A relationship between the leading length LL and the chord length CL is referred to herein as an airfoil protection factor or simply as "APF". In other words, for any given airfoil 130 having a predetermined chord length CL, as an amount of coverage provided by the leading edge protector 90 increases, so does the leading length LL and in turn the APF.

Figure 4:
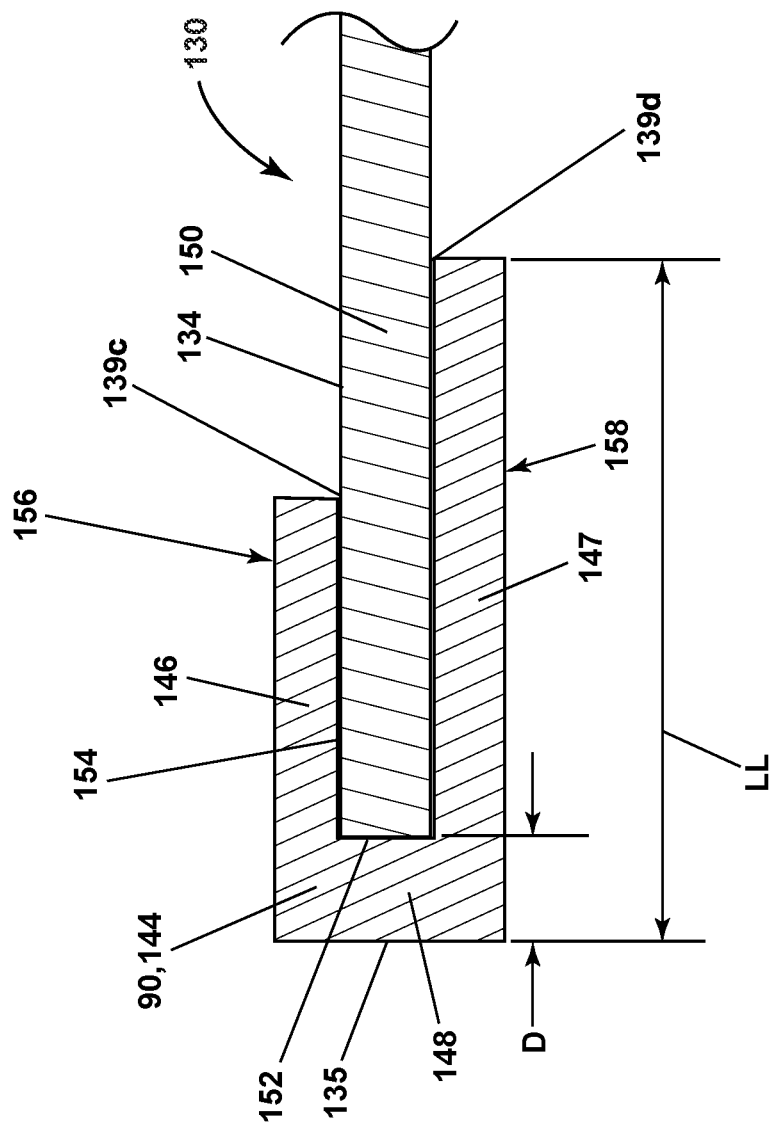
FIG. 4 is a schematic cross-section taken along line IV-IV of FIG. 3 illustrating a leading edge protector according to an aspect of the disclosure herein.

FIG. 4 is a schematic cross-section taken along line IV-IV of FIG. 3. The leading edge protector 90 is the sheath 144 with a first wall 146, a second wall 147, and a third wall 148 interconnecting the first wall 146 and the second wall 147. The first wall 146, second wall 147, and third wall 148 of the leading edge protector 90 are oriented and shaped such that they define a generally U-shaped (or C-shaped) channel 154 therebetween. As shown in FIG. 4 and as will be discussed below, the channel 154 is sized and shaped to receive at least a portion of the body leading edge 152 of the main body portion 150. Notably, the shape of the channel 154 is shown by way of example only and the channel 154 is not limited to this specific shape and is not necessarily drawn to scale.

The airfoil 130 can extend between a first side 156 and a second side 158. The seam 139 (FIG. 3) can include two seams 139c, 139d at corresponding ends of the channel 154. The leading length LL is measured from the leading edge 135 to the seam 139d furthest from the leading edge 135. While illustrated at two different locations, it should be understood that the seams 139c, 139d can be located at the same leading length LL. While illustrated as having rectangular blunt ends at the seam 139, the leading edge protector 90 can taper such that the leading edge protector 90 and the main body portion 150 are flush at the seam 90 to define the exterior surface 134.

It should be understood that the leading edge protector 90 of FIG. 4 can be the first leading edge protector 90a, the second leading edge protector 90b, or both the first and second leading edge protectors 90a, 90b.

Figure 5:
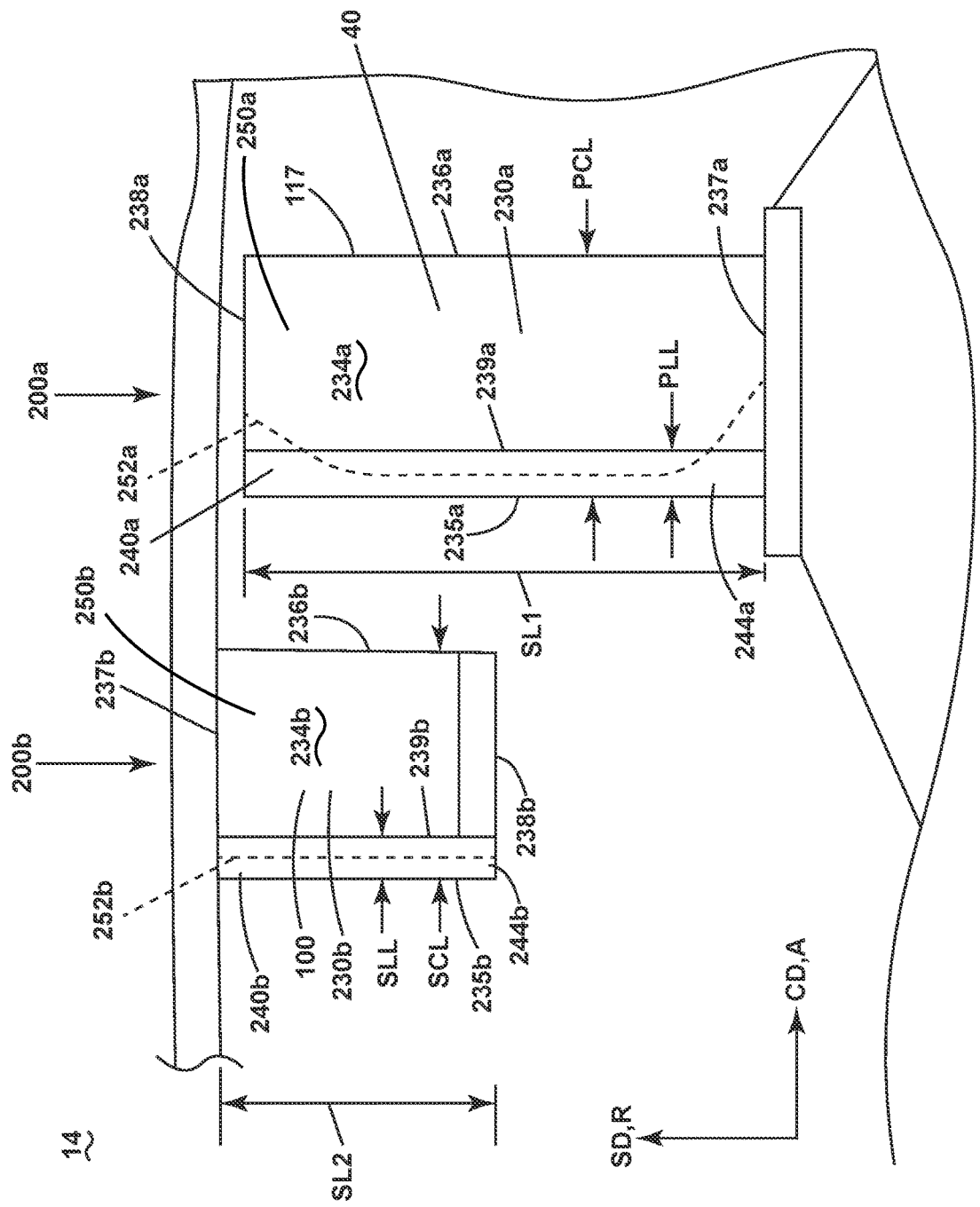
FIG. 5 is an enlarged, schematic, cross-sectional view similar to FIG. 2 and illustrating a primary stage of airfoils and a subsidiary stage of airfoils upstream from the primary stage of airfoils.

FIG. 5 is schematic enlarged view of a portion of the fan section 14. The plurality of fan blades 40 defines a primary stage of airfoils 200a within the fan section 14. A first airfoil 230a in the primary stage of airfoils 200a is similar to the previously described airfoil 130 (FIG. 3), therefore like parts of the first airfoil 230a will be identified with like numerals increased by 100 and having a notation "a" with it being understood that the description of the like parts of the airfoil 130 applies to the first airfoil 230a, except where noted. While only a single fan blade is shown in the cross-section, it will be understood that that the plurality of fan blades 40 are included and spaced about the fan section 14.

The first airfoil 230a has a first span length (denoted "SL1") measured along the spanwise direction SD between a first root 237a and a first tip 238a where the first root 237a is considered 0% of the first span length SL1 and the first tip 238a is considered 100% of the first span length SL1. The first span length SL1 is a measurement taken along the spanwise direction SD between the first root 237a and the first tip 238a of the first airfoil 230a at a first leading edge 235a.

A first leading edge protector 240a extends along the chordwise direction CD between the first leading edge 235a and a first seam 239a to define a primary leading length (denoted "PLL"). The first airfoil 230a has a primary chord length (denoted "PCL") measured along the chordwise direction CD between the first leading edge 235a and a first trailing edge 236a.

A relationship between the primary leading length PLL and the primary chord length PCL is denoted herein with a first expression of the APF:

$$APF1 = \frac{PLL}{PCL} \qquad (1)$$

The plurality of part-span IGVs 100 define a subsidiary stage of airfoils 200b upstream from the primary stage of airfoils 200a. A second airfoil 230b in the subsidiary stage of airfoils 200b is similar to the previously described airfoil 130, therefore like parts of the second airfoil 230b will be identified with like numerals increased by 100 and having a notation "b" with it being understood that the description of the like parts of the airfoil 130 applies to the second airfoil 230b, except where noted. The second airfoil 230b is located upstream from the first airfoil 230a. While only a single part-span IGV 100 is shown in the cross-section it will be understood that the plurality of part-span IGVs 100 are included and spaced about the fan section 14.

A second leading edge protector 240b extends along the chordwise direction CD between a second leading edge 235b and a second seam 239b to define a subsidiary leading length (denoted "SLL"). The second airfoil 230b has a subsidiary chord length (denoted "SCL") measured along the chordwise direction CD between the second leading edge 235b and a second trailing edge 236b.

The second airfoil 230b has a second span length (denoted "SL2") measured along the spanwise direction SD between a second root 237b and a second tip 238b where the second root 237b is considered 0% of the second span length SL2 and the second tip 238b is considered 100% of the second span length SL2. The second span length SL2 is the maximum distance between the second root 237b and the second tip 238b of the second airfoil 230b.

The first and second leading edge protectors 240a, 240b can each define first and second sheaths 244a, 244b. An exterior surface 234a, 234b of each airfoil 230a, 230b is defined by the corresponding first and second leading edge protectors 240a, 240b and corresponding first and second main body portions 250a, 250b. The first and second main body portions 250a, 250b can each include a corresponding first and second main body leading edge 252a, 252b which can define at least a portion of, or all of the corresponding seams 239a, 239b. The first and second main body portions 250a, 250b can both be composite components. It is further contemplated that the first main body portion 250a for the primary stage of airfoils 200a is a composite component while the second main body portion 250b for the subsidiary stage of airfoils 200b is metallic defining a subsidiary stage of metallic airfoils.

A relationship between the subsidiary leading length SLL and the subsidiary chord length SCL is denoted herein with a second expression of the APF:

$$APF2 = \frac{SLL}{SCL} \quad (2)$$

As will be further discussed herein, the APF describes an amount of protection coverage by the leading edge protector of any of the airfoils 130, 230a, 230b described herein. A balance trade-off between the amount of protection and the weight gain/loss associated with any of the leading edge protectors described herein can be expressed by an APF value of from 0.1 to 0.3, inclusive of endpoints. In other words, to satisfy protection requirements the leading edge protector described herein should protect at least 10% and up to and including 30% of the airfoil width as measured from the leading edge for the airfoils described herein before becoming too heavy.

The primary stage of airfoils 200a has a first number of airfoils and the subsidiary stage of airfoils 200b has a second number of airfoils that can be different than the first number. In other words, the consecutive stages of airfoils can vary in size and number of airfoils.

Figure 6:
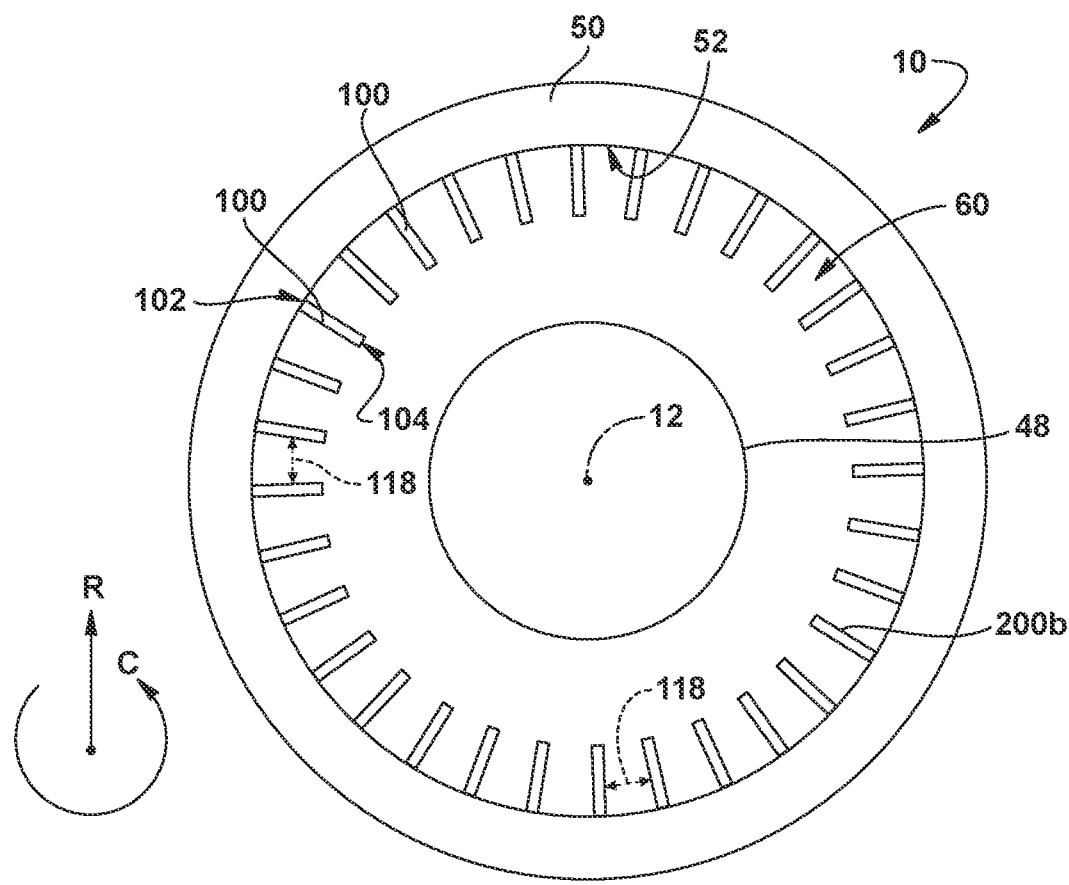
FIG. 6 is a first exemplary axial view of a first inlet arrangement for the turbine engine of FIG. 1 illustrating an arrangement of the subsidiary stage of airfoils according to one aspect of the disclosure herein.

FIG. 6 is a first exemplary axial view of the first inlet 60a to the turbine engine 10 of FIGS. 1 and 2 illustrating the plurality of part-span IGVs 100 of the turbine engine 10, by way of non-limiting example the subsidiary stage of airfoils 200b. A relatively large number of part-span IGVs 100 is shown, more specifically thirty-two part-span IGVs 100. Any number of the plurality of part-span IGVs 100 is contemplated including from twenty part-span IGVs 100 to about fifty part-span IGVs 100, from thirty part-span IGVs 100 to about forty-five part-span IGVs 100. Additionally, each of the plurality of part-span IGVs 100 are spaced substantially evenly along the circumferential direction CD. More specifically, each of the plurality of part-span IGVs 100 defines a circumferential spacing 118 with an adjacent part-span IGV 100, with the circumferential spacing 118 being substantially equal between each adjacent part-span IGV 100. While depicted as a substantially equal circumferential spacing, any spacing is contemplated.

Figure 7:
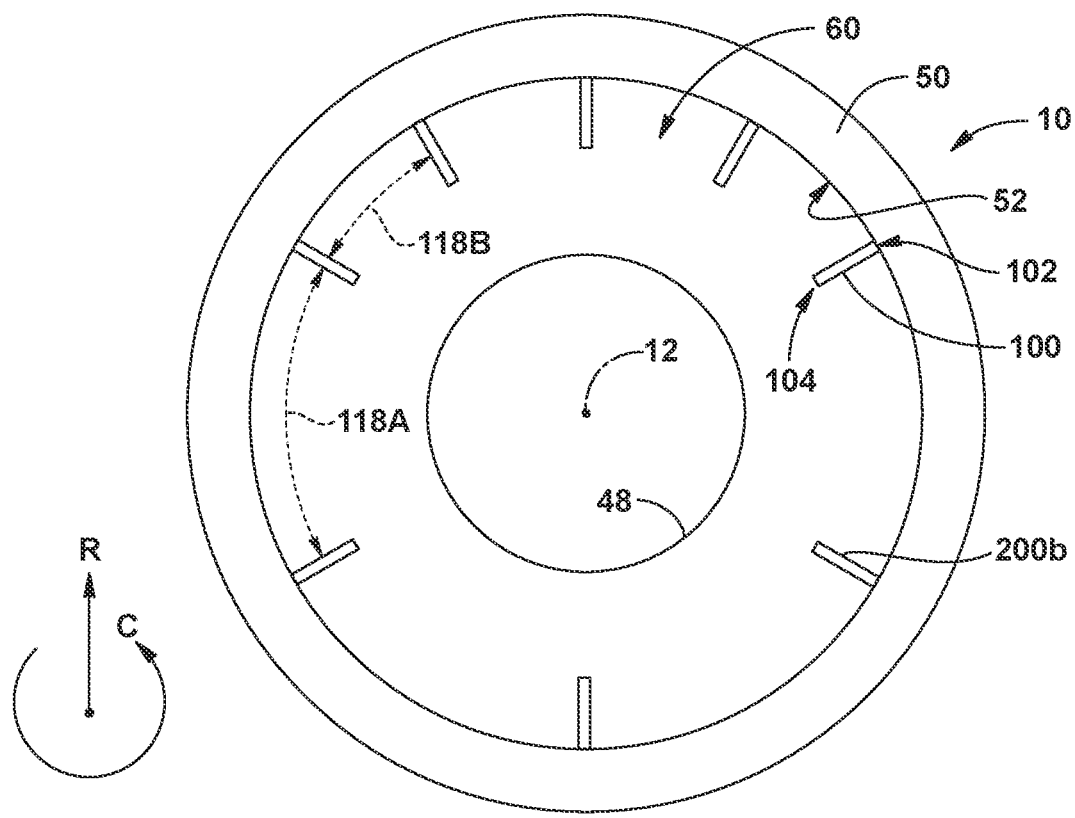
FIG. 7 is a second exemplary axial view of a second inlet arrangement for the turbine engine of FIG. 1 illustrating an arrangement of the subsidiary stage of airfoils according to another aspect of the disclosure herein.

For example, referring to FIG. 7, a second exemplary axial view of a second inlet 60b arrangement for the turbine engine 10 of FIGS. 1 and 2 is illustrated. Again, the plurality of part-span IGVs 100 of the turbine engine 10 are by way of non-limiting example the subsidiary stage of airfoils 200b. In the second exemplary inlet 60b the turbofan engine 10 can include less than twenty part-span IGVs 100. More specifically the turbofan engine 10 includes at least eight part span IGVs 100, or more specifically includes exactly eight part-span IGVs 100. Additionally, the plurality of part-span IGVs 100 are not substantially evenly spaced along the circumferential direction CD. For example, some of the plurality of part-span IGVs 100 define a first circumferential spacing 118A, while others of the part-span IGVs 100 define a second circumferential spacing 118B.

The number of part-span IGVs 100 may be greater than the number of fan blades 40 of the fan 38 of the turbine engine 10. In one non-limiting example the number of part-span IGVs 100 is two to three times greater than the number of fan blades 40. It is also contemplated that the number of part-span IGVs 100 is substantially equal to the number of fan blades 40 or less than the number of fan blades 40 of the fan 38 of the turbine engine 10. Further, it should be appreciated, that in other exemplary embodiments, the turbine engine 10 may include any other suitable number of part-span IGVs 100 and/or circumferential spacing 118 of the part-span IGVs 100.

It will be appreciated that the number, size, and configuration of the airfoils described herein are provided by way of example only and that in other exemplary embodiments, the airfoils may have any other suitable configuration including that the plurality of airfoils may be in multiple rotor stages, etc.

Finding a workable solution that balances the amount of protective covering for the airfoils as described herein whilst maintaining a weight requirement and maintaining the positive effects of the pre-swirl features 80 described herein is a labor-intensive and time-intensive process, because the process is iterative and involves the selection of multiple airfoils, both for the part-span IGVs 100 and the fan blades, with various protector leading edge protector lengths and chord lengths. Design procedures frequently require placing the airfoil 130 (FIG. 3) into a turbine engine designed for a first flight operating condition and embodying a protection effectiveness with acceptable weight gain/losses for that first flight operating condition. Evaluating whether in a second, third, or other flight operating condition, the same selected airfoil 130 maintains a heat effectiveness with acceptable protection effectiveness for the other operating conditions is time-intensive. In some cases, this may even result in a re-design of the airfoil and turbine engine if conditions are not met. Adding to the procedure implementing the pre-swirl features 80 as part-span IGVs 100 add considerable variables and outcomes.

It is desirable to have an ability to arrive at an improved airfoil, like the airfoil 130 described herein, rather than relying on chance. It would be desirable to have a limited or narrowed range of possible airfoil configurations for satisfying mission requirements, such requirements including protection, weight restrictions, heat transfer, pressure ratio, and noise transmission level requirements, as well as the ability to survive bird strikes at the time the airfoil 130 is selected and located within an engine.

The inventors sought to find the trade-off balance between leading edge protection and weight gain/loss while satisfying all design requirements including the benefits of implementing the pre-swirl features 80. Considering all of the variables would yield a more desired airfoil suited for specific needs of the engine, as described above. Knowing these trade-offs is also a desirable time saver.

TABLE 1 below illustrates example configurations for the primary stage of airfoils 200a and the subsidiary stage of airfoils 200b upstream of the primary stage of airfoils 200a that yielded workable solutions to the trade-off balance problem. It should be understood that the primary stage of airfoils 200a can be from the plurality of fan blades 40 and the subsidiary stage of airfoils 200b can be the plurality of part-span IGVs. For this particular set of examples, the SL2 is 25% of the SL1.

TABLE 1

| Parameter: | Variable | Examples | | | | Units |
| --- | --- | --- | --- | --- | --- | --- |
| | | 1 | 2 | 3 | 4 | |
| SL1 | First Span Length | | 130.2 | | | cm |
| | First Span Location | 20 | 40 | 60 | 80 | % |
| PCL | Primary chord length | 46.9 | 56.5 | 61.0 | 64.4 | cm |
| PLL | Primary leading length | 11.2 | 15.0 | 15.7 | 15.7 | cm |
| SL2 | Second Span Length | | 32.5 | | | cm |
| | Second Span Location | 20 | 40 | 60 | 80 | % |
| SCL | Subsidiary chord length | 12.7 | 12.7 | 12.7 | 12.7 | cm |
| SLL | Subsidiary leading length | 1.3 | 1.8 | 2.9 | 4.3 | cm |

The inventors discovered, unexpectedly, during the course of engine design and the time-consuming iterative process previously described, that a relationship exists between APF1 and the APF2. It has been found that a desired amount of protective covering of the primary stage of airfoils 200a lies within a specific range based on an amount of protective covering on the subsidiary stage of airfoils 200b. Further, the amount of protective covering on the primary stage of airfoils 200a is influenced by the second span length SL2 of the subsidiary stage of airfoils 200b. In other words, if second span length SL2 is 25% of the first span length SL1 as depicted in TABLE 1, the primary stage of airfoils 200a will require much less protective covering than when the second span length SL2 is 50% of the first span length SL1.

The inventors found that the modifications required on the primary stage of airfoils with respect to the structure and modifications of the subsidiary stage of airfoils could not be simply, consistently, or reliably predicted from models. Until this discovery, this could only be accomplished by the previous time-consuming and iterative process. The ratio of the primary and/or subsidiary leading length to the primary and/or subsidiary chord length is a carefully chosen balance between the leading edge dominating the response to a bird ingestion or similar event, and the airfoil material dominating the characteristics of the airfoil aerodynamics in normal operation. The primary stage of airfoils rotates and the subsidiary stage of airfoils is stationary, therefore the dynamics of a bird ingestion event differs for the two airfoils, resulting in the ratio of the two leading lengths to the respective chords lengths.

TABLE 2 below illustrates example consecutive airfoil stages with workable solutions to the trade-off balance problem. Different span percentages are shown in TABLE 2. It was found that the CL and LL should be taken for any position from 20% to 80%, inclusive of end points, of the span length SL of the fan blade. The Span % as indicated in TABLE 2 is measured as a percentage relative to the airfoil root. Therefore, it will be understood that the 20% location for the plurality of fan blades 40 is closest to the hub 48 and that the 80% location is farther from the hub 48 and closer to the fan tip 114. The 20% location for the part-span IGVs 100 is closest to the nacelle 50 and the 80% location is farther from the nacelle 50 and closer to the IGV tip 104. The specific range percentages of the span length SL was chosen because the airfoil may have different properties, profiles, etc. at its distal end. In the non-limiting examples, the dimensions of the plurality of fan blades 40 determined APF1 while the dimensions of the part-span IGVs 100 determined APF2.

TABLE 2

| Inlet Guide Vane | | | Fan Blade | | |
| --- | --- | --- | --- | --- | --- |
| Span (%) | CL (cm) | LL (cm) | Span (%) | CL (cm) | LL (cm) |
| 20 | 12.7 | 1.3 | 20 | 46.9 | 11.2 |
| 30 | 12.7 | 1.5 | 24 | 48.6 | 11.7 |
| 40 | 12.7 | 1.8 | 28 | 50.5 | 13.6 |
| 50 | 12.7 | 2.3 | 32 | 52.4 | 14.2 |
| 60 | 12.7 | 2.9 | 36 | 54.5 | 14.6 |
| 70 | 12.7 | 3.8 | 40 | 56.5 | 15.0 |
| 80 | 12.7 | 4.3 | 44 | 58.2 | 15.3 |
| | | | 48 | 59.4 | 15.5 |
| | | | 52 | 60.1 | 15.7 |
| | | | 56 | 60.6 | 15.6 |
| | | | 60 | 61.0 | 15.7 |
| | | | 64 | 61.5 | 15.5 |
| | | | 68 | 61.9 | 15.4 |
| | | | 72 | 65.0 | 15.4 |
| | | | 76 | 63.2 | 15.5 |
| | | | 80 | 64.4 | 15.7 |

Moreover, utilizing this relationship, the inventors found that the number of suitable or feasible airfoil possibilities for placement in a turbine engine that are capable of meeting the design requirements could be greatly reduced, thereby facilitating a more rapid down-selection of airfoils to consider as an engine is being developed. Such benefit provides more insight to the requirements for a given engine, and to the requirements for particular airfoil stages within the engine, long before specific technologies, integration, or system requirements are developed fully. The discovered relationship also avoids or prevents late-stage redesign while also providing both airfoil stages with a required protection effectiveness within given weight parameters.

The inventors moreover found that a relationship between the first expression of the APF, APF1, and the second expression of the APF, APF2, improves the protection amount for successive stages of airfoils. This relationship was an unexpected discovery during the course of engine design—i.e., designing multistage airfoil sections, such as by way of non-limiting examples fan sections, fan blades, and outlet guide vanes, and evaluating the impact that an amount of protection on the fan blade has on a desired amount of protection on the outlet guide vane, or vice versa. Defining an improved airfoil as described herein is based in-part on the surrounding airfoil properties such that an APF of a downstream airfoil is influenced by the APF of an upstream airfoil. Additionally, narrowing the options down based on surrounding stages of airfoils in view of this unexpected result can significantly decrease both material and time costs.

For example, referring again to FIG. 5, an amount of protection provided by the first leading edge protector 240a on the first airfoil 230a can affect an amount of protection necessary for the second airfoil 230b upstream of the first airfoil 230a. This relationship between the multistage airfoils or successive airfoils, such as 230*a* and 230*b*, can be described by a stage protection factor (denoted "SPF") determined from the aforementioned relationship between the APF1 and the APF2. The SPF is represented by a ratio of the first airfoil protection factor APF1 to the second airfoil protection factor APF2 by an Expression (3) below:

$$SPF = \frac{APF1}{APF2} = \frac{\left(\frac{PLL}{PCL}\right)}{\left(\frac{SLL}{SCL}\right)} \quad (3)$$

More specifically, it was found that for any position from 20% to 80%, inclusive of end points, of the span length SL, a desired SPF is greater than or equal to 0.30 and less than or equal to 5.0 (0.30≤SPF≤5.0). The specific range of the span length SL from 20% to 80% reflects the inventors' accounting for variation in properties unique to an airfoil in respect to its relationship with, e.g., the hub at the root and inner surface of a fan casing near the tip. It was found that for any position from 20% to 80% of the span length SL, inclusive of end points, the desired result is achieved when an airfoil SPF is spanwise more uniform, relatively speaking, over this range and therefore the determined ratios are applicable.

It will be understood that because of its size and movement, the rotating fan blade will likely require more coverage from the leading edge protector as compared to a static airfoil, which is driving the relationship ratio to the 0.30 to 5.0 range. This is due to the fact that the rotating blade has a higher kinetic energy from impact and is driven by the rotating velocity of the airfoil.

Utilizing this relationship, the inventors were able to arrive at a better performing airfoil in terms of protection amount with acceptable weight increase. The inventors found that the SPF for a first set of airfoils and a second set of airfoils upstream from the first set of airfoils could be narrowed to an SPF range of greater than or equal to 0.70 and less than or equal to 4.0 (0.70≤SPF≤4.0). Narrowing the SPF range provides more insight to the requirements for a given engine well before specific technologies, integration and system requirements are developed fully. For example, as the fan speed is reduced, coverage on the first leading edge 235*a* by the first leading edge protector 240*a* can decrease such that the APF1 also decreases. Further, knowing a range for the SPF can prevent or minimize late-stage redesign, decrease material cost, and save time.

The SPF value represents how an amount of protection on a primary stage of airfoils, like the primary stage of airfoils 200*a*, impacts an amount of protection necessary for any upstream airfoil stages with respect to the first set of airfoil stages.

In one example, the set of fan blades 40 illustrated in FIG. 5 can have dimensions of the Fan Blade at 20% from TABLE 2 and the plurality of part-span IGVs 100 can have dimensions of the Inlet Guide Vane at 20% from TABLE 2. This results in an APF1 value of (11.2/46.9) or 0.24 and an APF2 value of (1.3/12.7) or 0.10. Using expression (3) an SPF of (0.24/0.10) or 2.40 is found.

In another example, the set of fan blades 40 illustrated in FIG. 5 can have dimensions of the Fan Blade at 68% from TABLE 2 and the plurality of part-span IGVs 100 can have dimensions of the Inlet Guide Vane at 70% from TABLE 2. This results in an APF1 value of (15.4/61.9) or 0.25 and an APF2 value of (3.8/12.7) or 0.30. Using expression (3) an SPF of (0.25/0.30) or 0.83 is found.

Some lower and upper bound values for each design parameter for determining Expression (3) are provided below in TABLE 3:

TABLE 3

| Parameter | Lower Bound | | Upper Bound | |
|---|---|---|---|---|
| Span Location (%) | 20 | 80 | 20 | 80 |
| | First Airfoil | | | |
| PCL (cm) | 35.0 | 64.4 | 46.9 | 75.0 |
| PLL (cm) | 9 | 12.5 | 13.5 | 18.8 |
| | Second Airfoil | | | |
| SCL (cm) | 4.0 | 3.0 | 16.0 | 12.7 |
| SLL (cm) | 1 | 3.5 | 1.5 | 5.2 |

There are numerous tradeoffs in developing and designing a turbine engine and all of the corresponding parts. One parameter that can change as a result of other parameters is the number of fan blades. The number of blades in each stage of the engine is a carefully selected value that trades propulsive efficiency vs. acoustic signature and many other factors, including turbine speed and optionally a reduction gearbox ratio. By way of non-limiting example, a turbine engine with 35 k lbs thrust can have 16 fan blades having a wider chord than a 70 k lbs thrust turbine engine with 24 blades. The widest chord blade will be on a high thrust engine with few fan blades, and the smallest chord blade will be on a small engine with many blades, where in the middle there is a lot of potential overlap. Therefore, it is desirable to have a range that does not necessarily depend on the number of blades, but rather how the stages relate to each other.

It was found that first and second airfoil pairs with dimensions that fall within the ranges set out in TABLE 4 below fit into the airfoil dimensions previously described herein. These ranges enable a minimum weight gain for compact and well protected airfoils in succession.

TABLE 4

| Variable | Narrow Range | Broad Range |
|---|---|---|
| SPF | 0.70-4.0 | 0.30-5.0 |
| PCL (cm) | 38-65 | 30-71 |
| PLL (cm) | 7.5-16.5 | 5-20 |
| SCL (cm) | 1-15 | 0.75-20 |
| SLL (cm) | 1.8-6.5 | 0.75-7.5 |

Pairs of first and second airfoils, with the second airfoils downstream of the first airfoils, within the ranges provided can be assembled to conform with a fan section, or other downstream stage relationship within an engine core for blades/vanes and blades/blades.

The SPF is useful for making trade-offs when determining an amount of protection on a first airfoil in relationship to an amount on an airfoil downstream of the first airfoil. For example, when there is a limited space available for a fan blade in a fan section, knowledge of those dimensions and the downstream airfoil dimensions enables determination of an acceptable protector with a leading edge protector length allowing for sufficient leading edge protection.

Benefits associated with the SPF described herein include a quick assessment of design parameters in terms of airfoils in downstream relationship. Further, the SPF described herein enables a quick visualization of tradeoffs in terms of geometry that are bounded by the constraints imposed by the materials used, the available space in which the airfoils are located, the type of turbine engine or system enclosures and the configuration of surrounding components, or any other design constraint. The SPF enables the manufacturing of high performing airfoil stages with peak performance with the factors available. While narrowing these multiple factors to a region of possibilities saves time, money, and resources, the largest benefit is at the system level, where the airfoil stages described herein enable improved system performance. Previously developed airfoil stages may peak in one area of performance by design, but lose efficiency or lifetime benefits in another area of performance. In other words, the SPF enables the development and production of higher performing airfoil stages across multiple performance metrics within a given set of constraints. The improved airfoil designs defined by the APF and SPF relationships account for these factors and desirable outcomes.

To the extent one or more structures provided herein can be known in the art, it should be appreciated that the present disclosure can include combinations of structures not previously known to combine, at least for reasons based in part on conflicting benefits versus losses, desired modes of operation, or other forms of teaching away in the art.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A turbine engine, comprising an engine core defining an engine centerline and comprising a rotor assembly and a stator assembly; a primary stage of airfoils circumferentially arranged about the engine centerline and defining at least a portion of the rotor assembly, a first airfoil of the primary stage of airfoils comprising a first main body portion extending chordwise between a first body leading edge and a first trailing edge; and a first leading edge protector receiving at least a portion of the first body leading edge of the first main body portion, the first leading edge protector extending chordwise from a first leading edge towards the first trailing edge for a primary leading length (PLL); wherein the first main body portion and the first leading edge protector together define an exterior surface of the first airfoil and extend chordwise between the first leading edge and the first trailing edge to define a primary chord length (PCL); a subsidiary stage of airfoils located upstream of the primary stage of airfoils and circumferentially arranged about the engine centerline, a second airfoil of the subsidiary stage of airfoils comprising: a second main body portion extending chordwise between a second body leading edge and a second trailing edge; and a second leading edge protector receiving at least a portion of the second body leading edge of the second main body portion, the second leading edge protector extending chordwise from a second leading edge towards the second trailing edge for a subsidiary leading length (SLL); wherein the second main body portion and the second leading edge protector together define an exterior surface of the second airfoil and extend chordwise between the second leading edge and the second trailing edge to define a subsidiary chord length (SCL); wherein the primary leading length (PLL) and the primary chord length (PCL) are related to the subsidiary leading length (SLL) and the subsidiary chord length (SCL) by a stage protection factor (SPF), and wherein $$SPF = \frac{\left(\frac{PLL}{PCL}\right)}{\left(\frac{SLL}{SCL}\right)}$$

and SPF is greater than or equal to 0.3 and less than or equal to 5 (0.3≤SPF≤5).

The turbine engine of any preceding clause, wherein the primary stage of airfoils and the subsidiary stage of airfoils both include composite airfoils.

The turbine engine of any preceding clause, wherein the composite airfoils include a polymer matrix composite (PMC).

The turbine engine of any preceding clause, wherein at least one of the first leading edge protector or the second leading edge protector is a metallic leading edge protector.

The turbine engine of any preceding clause, wherein at least one of the first leading edge protector or the second leading edge protector is a metallic leading edge protector.

The turbine engine of any preceding clause, wherein the subsidiary stage of airfoils is a subsidiary stage of metallic airfoils.

The turbine engine of any preceding clause, wherein the primary stage of airfoils includes a plurality of fan blades.

The turbine engine of any preceding clause, wherein the airfoils of the subsidiary stage of airfoils are part-span inlet guide vanes.

The turbine engine of any preceding clause, further comprising a nacelle surrounding and at least partially enclosing the plurality of fan blades.

The turbine engine of any preceding clause, wherein the part-span inlet guide vanes are integrated with the nacelle.

The turbine engine of any preceding clause, wherein the part-span inlet guide vanes are cantilevered.

The turbine engine of any preceding clause, wherein the PLL ranges from 5.0 to 20 cm.

The turbine engine of any preceding clause, wherein the PCL ranges from 30 cm to 70 cm and the SCL ranges from 0.75 cm to 20 cm.

The turbine engine of any preceding clause, wherein the SLL ranges from 0.75 cm to 37.5 cm.

The turbine engine of any preceding clause, wherein the first airfoil extends spanwise between a first root and a first tip to define a first span length and wherein the second airfoil extends spanwise between a second root and a second tip to define a second span length and wherein the SPF is measured from 20% to 80% of the first span length and the second span length.

The turbine engine of any preceding clause, wherein at least one of the first leading edge protector or the second leading edge protector is made of a polyurethane or thermoplastic material.

The turbine engine of any preceding clause, wherein at least one of the first leading edge protector or the second leading edge protector is made of a composite material.

The turbine engine of any preceding clause, wherein the primary stage of airfoils has a first number of airfoils and the subsidiary stage of airfoils has a second number of airfoils and the first number is less than the second number.

The turbine engine of claim 18, wherein the second number is two to three times greater than the first number.

The turbine engine of claim 1, wherein the SPF is greater than or equal to 0.7 and less than or equal to 4.0 (0.7≤SPF≤4.0).

The turbine engine of any preceding clause wherein the first leading edge protector and the second leading edge protector each comprise a sheath.

The turbine engine of any preceding clause further comprising a tip cap receiving at least a portion of the second tip.

The turbine engine of any preceding clause, wherein the tip cap extends a full axial length of the second tip.

The turbine engine of any preceding clause, wherein the first leading edge protector is metallic and the second leading edge protector is made of a composite material.

The turbine engine of any preceding clause, wherein the first leading edge protector is made of a composite material and the second leading edge protector is metallic.

The turbine engine of any preceding clause, wherein both the first leading edge protector and the second leading edge protector are made of composite material.

The turbine engine of any preceding clause, wherein both the first leading edge protector and the second leading edge protector are metallic.

The turbine engine of cany preceding clause, wherein the subsidiary stage of airfoils are metallic airfoils.

The turbine engine of any preceding clause, wherein the primary stage of airfoils are composite airfoils.

We claim:

1. A turbine engine, comprising:
   an engine core defining an engine centerline and comprising a rotor assembly and a stator assembly;
   a primary stage of airfoils circumferentially arranged about the engine centerline and defining at least a portion of the rotor assembly, a first airfoil of the primary stage of airfoils comprising:
      a first main body portion extending chordwise between a first body leading edge and a first trailing edge; and
      a first leading edge protector receiving at least a portion of the first body leading edge of the first main body portion, the first leading edge protector extending chordwise from a first leading edge towards the first trailing edge of the first main body portion for a primary leading length (PLL);
   wherein the first main body portion and the first leading edge protector together define an exterior surface of the first airfoil, wherein the first leading edge of the first leading edge protector is different from and forward of the first body leading edge of the first main body portion, and
   wherein a primary chord length (PCL) is defined as extending chordwise between the first leading edge of the first leading edge protector and the first trailing edge of the first main body portion; and
   a subsidiary stage of airfoils located upstream of the primary stage of airfoils and circumferentially arranged about the engine centerline, a second airfoil of the subsidiary stage of airfoils comprising:
      a second main body portion extending chordwise between a second body leading edge and a second trailing edge; and
      a second leading edge protector receiving at least a portion of the second body leading edge of the second main body portion, the second leading edge protector extending chordwise from a second leading edge towards the second trailing edge of the second main body portion for a subsidiary leading length (SLL);
   wherein the second main body portion and the second leading edge protector together define an exterior surface of the second airfoil, wherein the second leading edge of the second leading edge protector is different from and forward of the second body leading edge of the second main body portion, and
   wherein a subsidiary chord length (SCL) is defined as extending chordwise between the second leading edge of the second leading edge protector and the second trailing edge of the second main body portion;
   wherein the primary leading length (PLL) and the primary chord length (PCL) are related to the subsidiary leading length (SLL) and the subsidiary chord length (SCL) by a stage protection factor (SPF), and
   wherein $$SPF = \frac{\left(\frac{PLL}{PCL}\right)}{\left(\frac{SLL}{SCL}\right)}$$

and SPF is greater than or equal to 0.3 and less than or equal to 5 (0.3≤SPF≤5).

2. The turbine engine of claim 1, wherein the primary stage of airfoils and the subsidiary stage of airfoils both include composite airfoils.

3. The turbine engine of claim 2, wherein the composite airfoils include a polymer matrix composite (PMC).

4. The turbine engine of claim 3, wherein at least one of the first leading edge protector or the second leading edge protector is a metallic leading edge protector.

5. The turbine engine of claim 1, wherein at least one of the first leading edge protector or the second leading edge protector is a metallic leading edge protector.

6. The turbine engine of claim 5, wherein the subsidiary stage of airfoils is a subsidiary stage of metallic airfoils.

7. The turbine engine of claim 1, wherein the primary stage of airfoils includes a plurality of fan blades.

8. The turbine engine of claim 7, wherein the airfoils of the subsidiary stage of airfoils are part-span inlet guide vanes.

9. The turbine engine of claim 8, further comprising a nacelle surrounding and at least partially enclosing the plurality of fan blades.

10. The turbine engine of claim 9, wherein the part-span inlet guide vanes are integrated with the nacelle.

11. The turbine engine of claim 10, wherein the part-span inlet guide vanes are cantilevered.

12. The turbine engine of claim 8, wherein the first airfoil extends spanwise between a first root and a first tip to define a first span length and wherein the second airfoil extends spanwise between a second root and a second tip to define a second span length and wherein the SPF is measured from 20% to 80% of the first span length and the second span length.

13. The turbine engine of claim 1, wherein the PLL ranges from 5.0 to 20 cm.

14. The turbine engine of claim 13, wherein the PCL ranges from 30 cm to 71 cm and the SCL ranges from 0.75 cm to 20 cm.

15. The turbine engine of claim 14, wherein the SLL ranges from 0.75 cm to 7.5 cm.

16. The turbine engine of claim 1, wherein at least one of the first leading edge protector or the second leading edge protector is made of a polyurethane or a thermoplastic material.

17. The turbine engine of claim 1, wherein at least one of the first leading edge protector or the second leading edge protector is made of a composite material.

18. The turbine engine of claim 1, wherein the primary stage of airfoils has a first number of airfoils and the subsidiary stage of airfoils has a second number of airfoils and the first number is less than the second number.

19. The turbine engine of claim 18, wherein the second number is two to three times greater than the first number.

20. The turbine engine of claim 1, wherein the SPF is greater than or equal to 0.7 and less than or equal to 4.0 ($0.7 \leq SPF \leq 4.0$).

* * * * *